US009989299B1

(12) United States Patent
Ballard

(10) Patent No.: US 9,989,299 B1
(45) Date of Patent: Jun. 5, 2018

(54) COOLER

(71) Applicant: Robert Ballard, Barboursville, WV (US)

(72) Inventor: Robert Ballard, Barboursville, WV (US)

(*) Notice: Subject to any disclaimer, the term of this patent is extended or adjusted under 35 U.S.C. 154(b) by 0 days. days.

(21) Appl. No.: 15/493,810

(22) Filed: Apr. 21, 2017

(51) Int. Cl.
| F25D 23/00 | (2006.01) |
| F25D 27/00 | (2006.01) |
| F25D 3/06 | (2006.01) |
| F25D 25/02 | (2006.01) |
| F21S 4/22 | (2016.01) |
| F21S 9/02 | (2006.01) |
| A47G 23/02 | (2006.01) |
| B65D 25/04 | (2006.01) |
| B65D 25/28 | (2006.01) |
| B65D 81/38 | (2006.01) |

(Continued)

(52) U.S. Cl.
CPC ............. *F25D 27/00* (2013.01); *A47G 23/02* (2013.01); *B62B 5/067* (2013.01); *B65D 25/04* (2013.01); *B65D 25/2802* (2013.01); *B65D 81/3813* (2013.01); *B65D 83/0805* (2013.01); *F21S 4/22* (2016.01); *F21S 9/02* (2013.01); *F25D 3/06* (2013.01); *F25D 25/025* (2013.01); *B62B 2204/06* (2013.01); *B65D 2525/287* (2013.01); *F25D 2327/001* (2013.01); *F25D 2400/38* (2013.01)

(58) Field of Classification Search
CPC ........ F25D 27/00; F25D 27/005; F25D 25/00; F25D 25/005; F25D 25/02; F25D 25/021; F25D 25/024; F25D 25/028; F25D 25/025; F21S 4/20; F21S 4/22; F21S 4/00; F21S 9/02; B62B 5/067; B65D 25/04; B65D 25/2802; B65D 25/28; B65D 81/3813
See application file for complete search history.

(56) References Cited

U.S. PATENT DOCUMENTS

| 2,786,337 A | 3/1957 | Spring |
| 4,225,059 A | 9/1980 | Kappos |
| 5,117,649 A | 6/1992 | Mangini et al. |

(Continued)

FOREIGN PATENT DOCUMENTS

| EP | 1072852 | 8/2005 |
| EP | 2431686 | 3/2012 |

(Continued)

OTHER PUBLICATIONS

Stainless Steel Prep Table in Black With Casters Storage Compartment Refrigerated for Kitchen Furniture Ideas, retrieved on Dec. 7, 2017 from m-wasikowska.org.

Primary Examiner — Steven A. Reynolds
Assistant Examiner — Javier A Pagan
(74) Attorney, Agent, or Firm — Bryan Cave Leighton Paisner

(57) ABSTRACT

A cooler includes a bottom, a top, a left side, a right side, a front, and a back defining an interior. A plurality of lights extends along at least one of the back corners of the cooler. The interior of the cooler is divided into a bottom insulated portion for storing items that must remain cold and a top non-insulated portion for storing utensils, and other items without temperature requirements. The top of the cooler includes a food preparation surface. Optionally, the cooler includes a handle having at least one light directed toward the top of the cooler.

20 Claims, 7 Drawing Sheets

(51) Int. Cl.
 *B65D 83/08* (2006.01)
 *B62B 5/06* (2006.01)

(56) References Cited

U.S. PATENT DOCUMENTS

| | | | |
|---|---|---|---|
| 5,191,769 | A | 3/1993 | Mangini et al. |
| 5,551,569 | A * | 9/1996 | Garvin-Mazzarisi ..... B65F 1/14 206/457 |
| 6,435,390 | B1 * | 8/2002 | Abramowicz ......... A01K 97/06 224/629 |
| 6,532,756 | B1 | 3/2003 | Wang et al. |
| 7,040,114 | B2 | 5/2006 | Lee et al. |
| 7,284,393 | B1 * | 10/2007 | Macmillan ................ B62B 1/22 62/331 |
| 7,296,434 | B2 | 11/2007 | Scroggs |
| 7,310,967 | B2 | 12/2007 | Aragon |
| 7,334,851 | B2 | 2/2008 | Rose et al. |
| 8,038,235 | B2 | 10/2011 | Lowery et al. |
| 2006/0228201 | A1 | 10/2006 | Lenceski |
| 2007/0295733 | A1 | 12/2007 | Balva et al. |
| 2009/0158754 | A1 | 6/2009 | Li et al. |
| 2010/0126196 | A1 * | 5/2010 | McCance ............... A45C 11/20 62/264 |
| 2010/0212344 | A1 * | 8/2010 | Mattucci ................. F25D 27/00 62/264 |
| 2011/0300272 | A1 | 12/2011 | Smario |
| 2012/0120653 | A1 * | 5/2012 | Peck ......................... F21S 4/28 362/235 |
| 2013/0207360 | A1 * | 8/2013 | Vanderberg .............. A45C 5/14 280/30 |
| 2015/0135763 | A1 | 5/2015 | Lee |
| 2016/0290705 | A1 | 10/2016 | Jenkinson et al. |

FOREIGN PATENT DOCUMENTS

| | | |
|---|---|---|
| GB | 1319855 | 6/1973 |
| WO | 03009723 | 2/2003 |

* cited by examiner

COOLER

FIELD OF THE DISCLOSURE

The present disclosure generally relates to coolers, and more particularly to a cooler having lights for illuminating the cooler.

BACKGROUND

People often transport food and drink in coolers, for example, when going to a barbeque or a tailgate. Typically, accessories such as utensils and napkins can be carried in a separate container, or placed in the cooler and risk contaminating/damaging the utensils, napkins, or cooler contents. Furthermore, a separate food preparation surface may be required. Coolers are used during both the day and the night, and users may have a problem identifying their cooler, seeing their cooler in the dark, or grabbing or preparing food in low light conditions.

SUMMARY OF THE DISCLOSURE

Among the various aspects of the present disclosure is the provision of a cooler as substantially shown and described.

Briefly, therefore, one aspect of the disclosure is directed to a cooler including a bottom, a top opposite the bottom, a left side extending between a left edge of the bottom and a left edge of the top, a right side opposite the left side and extending between a right edge of the bottom and a right edge of the top, a front extending between a front edge of the bottom and a front edge of the top, and a back opposite the front and extending between a back edge of the bottom and a back edge of the top. The bottom, top, left side, right side, front, and back define an interior of the cooler. A plurality of lights extends along at least one of a junction between the left side and the back and a junction between the right side and the back.

Another aspect of the disclosure is directed to a cooler including a bottom, a top opposite the bottom, a left side extending between a left edge of the bottom and a left edge of the top, a right side opposite the left side and extending between a right edge of the bottom and a right edge of the top, a front extending between a front edge of the bottom and a front edge of the top, and a back opposite the front and extending between a back edge of the bottom and a back edge of the top. The bottom, top, left side, right side, front, and back define an interior of the cooler. The top of the cooler includes a food preparation surface. The left and right sides of the cooler comprise textured surfaces. An intermediate surface is positioned between the bottom and the top of the cooler and divides the interior of the cooler into a bottom portion below the intermediate surface and a top portion above the intermediate surface. The bottom portion of the interior is accessible through a front opening and the top portion of the interior is accessible through a top opening. A first hollow casing extends along a junction between the left side and the back of the cooler. The first hollow casing contains a plurality of lights including a first portion configured to direct light outward away from the junction between the left side and the back of the cooler and a second portion configured to direct light along the left side of the cooler. A second hollow casing extends along a junction between the right side and the back of the cooler. The second hollow casing contains a plurality of lights including a first portion configured to direct light outward away from the junction between the right side and the back of the cooler and a second portion configured to direct light along the right side of the cooler. A third hollow casing extends along the front of the cooler. The third hollow casing contains a plurality of lights configured illuminate at least one of the front opening and the bottom portion of the interior of the cooler.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

Like reference numerals indicate corresponding parts throughout the several views of the drawings.

DETAILED DESCRIPTION

The accompanying Figures and this description depict and describe aspects of a cooler in accordance with the present disclosure, and features and components thereof. It should also be noted that any references herein to front and back, right and left, top and bottom and upper and lower are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Figure 1:
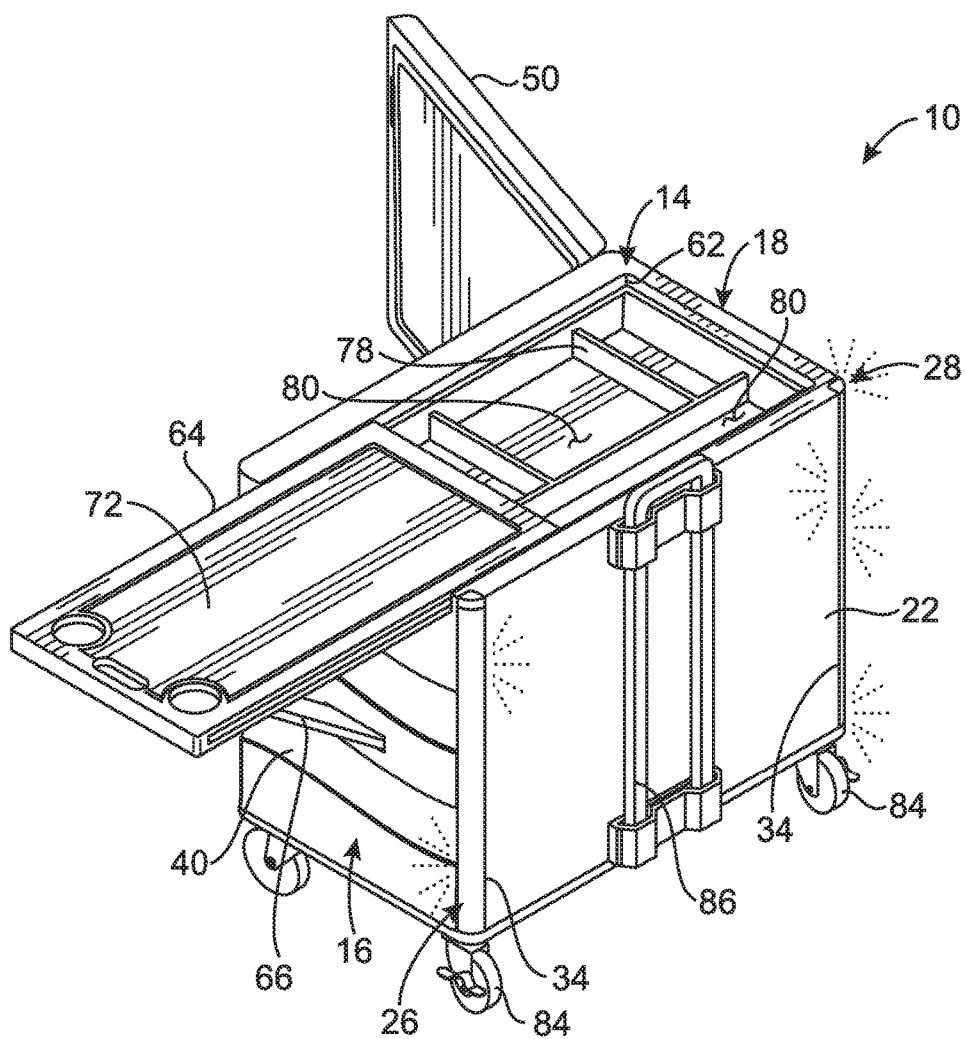
FIG. 1 is a rear perspective of a cooler according to an embodiment of the present invention.

Referring to FIG. 1, a cooler for holding food, drinks, and related items is shown generally at 10. The cooler 10 may be used to maintain the temperature of certain foods and drinks, while also storing other food, drinks, or accessories, as described in more detail below.

Referring to FIGS. 1-8, the cooler 10 includes a bottom 12, a top 14, a left side 16, a right side 18, a front 20, and a back 22, which together define an interior 24 of the cooler. The bottom 12 and the top 14 are generally horizontal and in opposed relation to each other. The left and right sides 16, 18 are generally vertical and in opposed relation to each other. The front 20 and back 22 are generally vertical and in opposed relation to each other. As illustrated, and as known in the art, the left side 16 extends between a left edge of the bottom 12 and a left edge of the top 14, and between a left edge of the front 20 and a left edge of the back 22. A junction or corner 26 between the left side 16 and the back 22 extends generally vertically from the bottom 12 to the top 14. As illustrated, and as known in the art, the right side 18 extends between a right edge of the bottom 12 and a right edge of the top 14, and between a right edge of the front 20 and a right edge of the back 22. A junction or corner 28 between the right side 18 and the back 22 extends generally vertically from the bottom 12 to the top 14.

Figure 4:
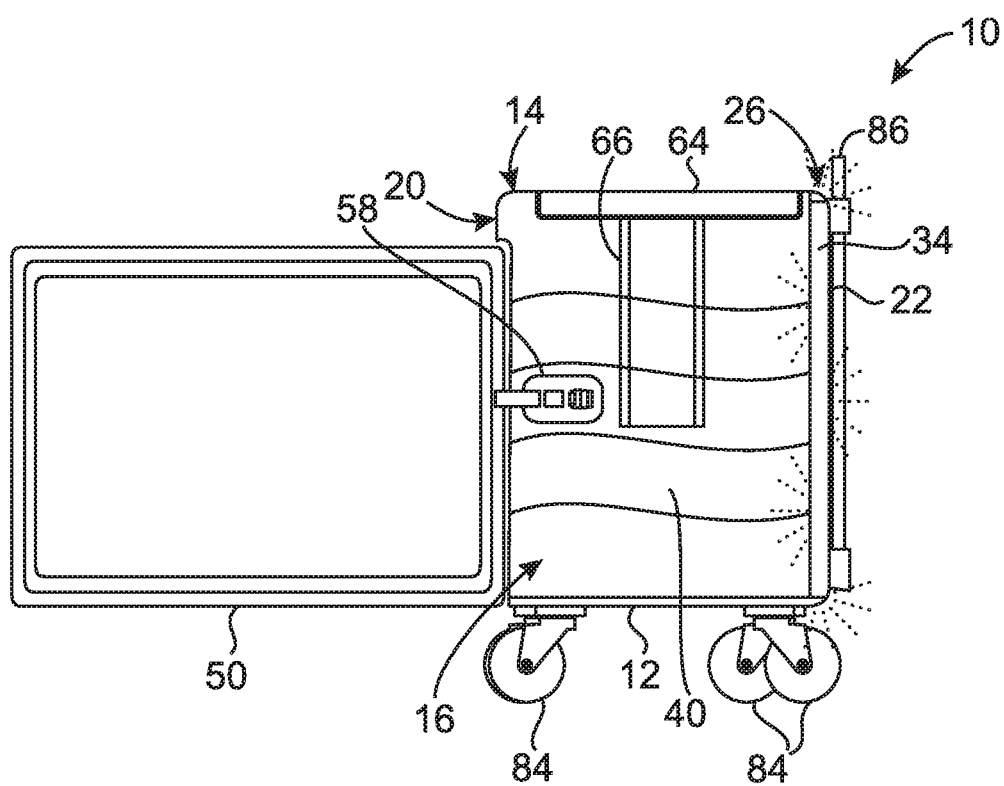
FIG. 4 is a left side view of a cooler according to an embodiment of the present invention.
Figure 5:
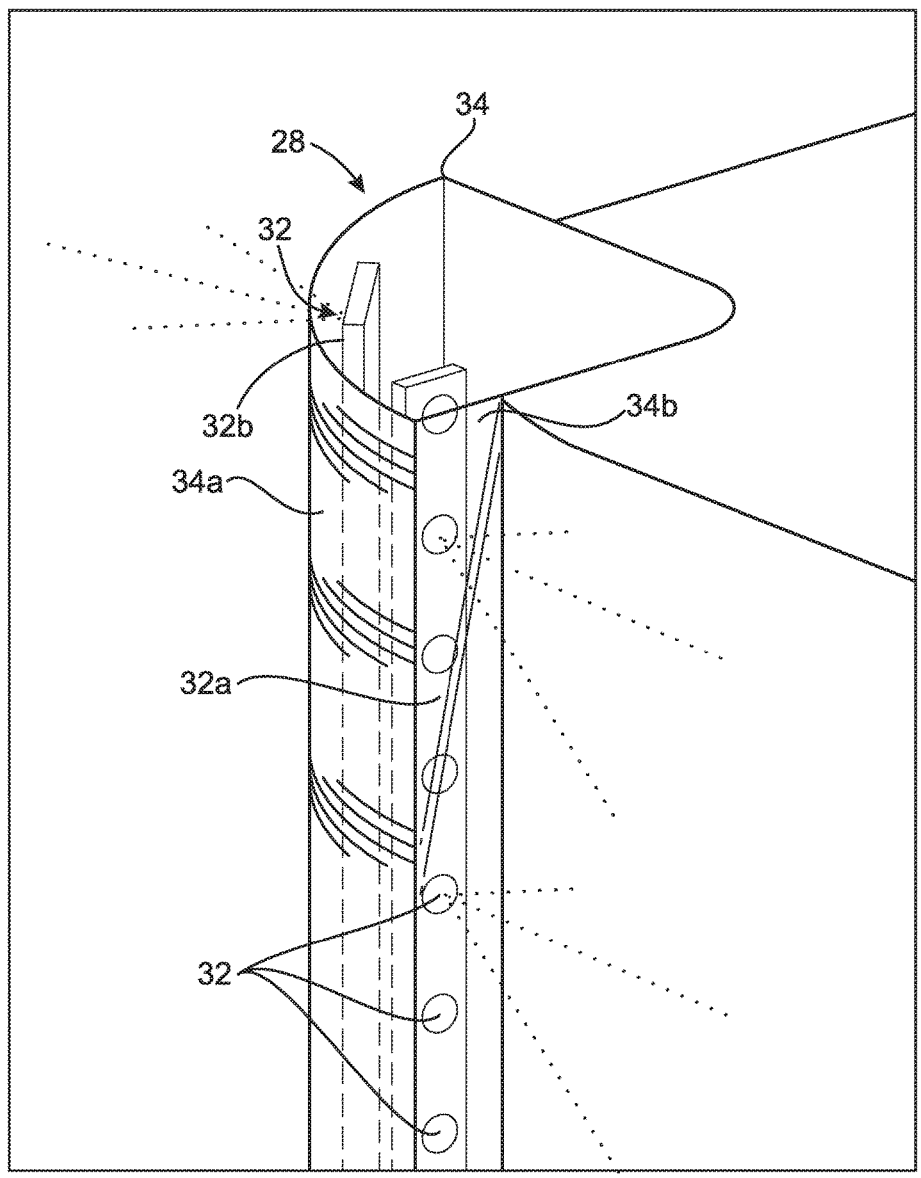
FIG. 5 is an enlarged partial perspective of a cooler according to an embodiment of the present invention, illustrating a plurality of lights extending along a junction of the cooler.

As illustrated in FIGS. 1, 4, and 5, a plurality of lights 32 extends along at least one of the junctions 26, 28. In the illustrated embodiment, a plurality of lights 32 extends along both of the junctions 26, 28, although other configurations are within the scope of the present invention. The plurality of lights may extend along an entire height of the cooler (e.g., in one embodiment, the plurality of lights may extend for a distance of about 18 inches). The junction 26, 28 may comprise a generally tubular or hollow casing 34. The plurality of lights 32 may be positioned within the hollow casing 34. For example, the plurality of lights 32 may be contained in the casing and positioned at spaced locations along the length of the casing. The hollow casing 34 protects the lights 32 from damage (e.g., from contact, from the elements, etc.). In one embodiment, the hollow casing is made of plastic (e.g., polypropylene, acrylic, or other suitable plastic), although any suitable material may be used within the scope of the present invention. As illustrated, the plurality of lights 32 may comprise a strip of lights, such as a flexible strip of LED lights, positioned in the hollow casing 34. As described in more detail below, the plurality of lights 32 may include multiple strips of lights positioned in the hollow casing 34 and configured and positioned to direct light in different directions. The lights may be battery powered, and the cooler 10 may include a battery pack or pouch on the bottom 12 (not shown). In one embodiment, the LED light strips can have an intensity of at least 100 lumens, such as 300-1000 lumens. In one embodiment, the LED light strips can be high intensity light strips having an aggregate intensity in the range of 1000-3600 lumens. Other configurations are within the scope of the present invention, such as higher or lower intensities.

The hollow casing 34 may be configured to direct or otherwise affect the illumination from the plurality of lights 32. For example, referring to FIG. 5, the hollow casing can include a first section 34a and a second section 34b. In one embodiment, the first section 34a has a first material finish, and the second section 34b has a second material finish different from the first material finish. For example, in one embodiment, the first section 34a has a frosted finish and the second section 34b is clear with no finish. Other configurations are within the scope of the present invention. For example, any section or portion of the hollow casing can have one or more material finishes (e.g., no finish, frosted, pebbled, flocked, matte, glossy, laced, canvas, embossed, satin, no-glare, corrugated, etc.). The hollow casing 34 can have more than two sections distinguished by different material finishes. For example, in one embodiment, the hollow casing can have three sections, with a middle section having a frosted finish separating two sections having no finish. The different finishes affect the illumination from the lights 32 in different ways (e.g., by directing, scattering, diffusing, reflecting, or otherwise affecting the light from the plurality of lights 32).

In one embodiment, as illustrated in FIG. 5, the plurality of lights 32 comprises a first portion 32a configured and positioned to direct light through the first section 34a of the hollow casing 34 and a second portion 32b configured and positioned to direct light through the second section 34b of the hollow casing. The first and second portions 32a, 32b may comprise separate strips of lights, a single strip folded back on itself, or any other configuration of lights. Additional lights may be included within the scope of the present invention (e.g., additional strips, the same strip folded upon itself multiple times, or any other configuration). The additional lights can be aligned with sections of the hollow casing, or may not be aligned with the sections within the scope of the present invention.

As shown in FIGS. 1, 4, and 5, in one embodiment, the first portion 32a extends along substantially the entire length of the hollow casing 34. The first portion 32a is positioned such that the light from the first portion is directed outward in a direction away from the junction 26, 28. Light from the first portion 32a is directed outward through the first section 34a (e.g., the frosted section) of the hollow casing 34.

Referring still to FIGS. 1, 4, and 5, the second portion 32b extends along substantially the entire length of the hollow casing 34. The second portion 32b is positioned such that the light from the second portion is directed along the respective left or right side 16, 18 of the cooler 10. Light from the second portion 32b is directed along the side 16, 18 of the cooler 10 through the second section 34b (e.g., clear section) of the hollow casing 34. Thus, a portion of the plurality of lights 32 directs light away from the cooler 10 to illuminate the cooler, and a portion of the plurality of lights directs light along a side of the cooler to illuminate the cooler.

Referring to FIGS. 1, 4, 6, and 7, one or more sides of the cooler 10 may comprise a textured surface 40. In the illustrated embodiment, the left and right sides 16, 18 each comprise a textured surface 40. The textured surface 40 is at least one of waved, etched, notched, patterned, or otherwise textured. In one embodiment, the textured surface 40 comprises a plastic 3D printed surface. The textured surface 40 is configured to increase the visibility of the light directed along the respective side 16, 18 of the cooler 10. In the illustrated embodiment, when light from the second portion 32b of the plurality of lights 32 is directed along a side 16, 18 of the cooler 10, the light catches the textured surface 40 of that side to illuminate the cooler.

Referring now to FIGS. 1-4 and 6-8, the front 20 of the cooler 10 comprises a door 50 movable between an open position (FIGS. 1-4, 7) and a closed position (FIGS. 6, 8) to selectively permit access to the interior 24 of the cooler through a front opening 52. The door 50 sealingly closes the front opening 52 to maintain the temperature of the interior of the cooler, as is known in the art. A plurality of lights 54 extends along a top edge of the front opening 52 to illuminate at least one of the front opening and the interior 24 of the cooler 10. The lights 54 may be positioned in a hollow casing 56 and may comprise a strip of lights, similar to the lights and hollow casing discussed above. The lights 54 are positioned above the door 50 such that the lights are visible even when the door 50 is closed, to illuminate the door for a user. As illustrated, in one embodiment the door 50 is hinged to permit rotational movement between the open position and the closed position. The cooler 10 optionally includes a latch 58 to secure the door 50 in a closed position for transport and ensure the door is fully closed to maintain the cool temperature in the interior 24. Other configurations of the door and the lights along the front opening are within the scope of the present invention.

Figure 2:
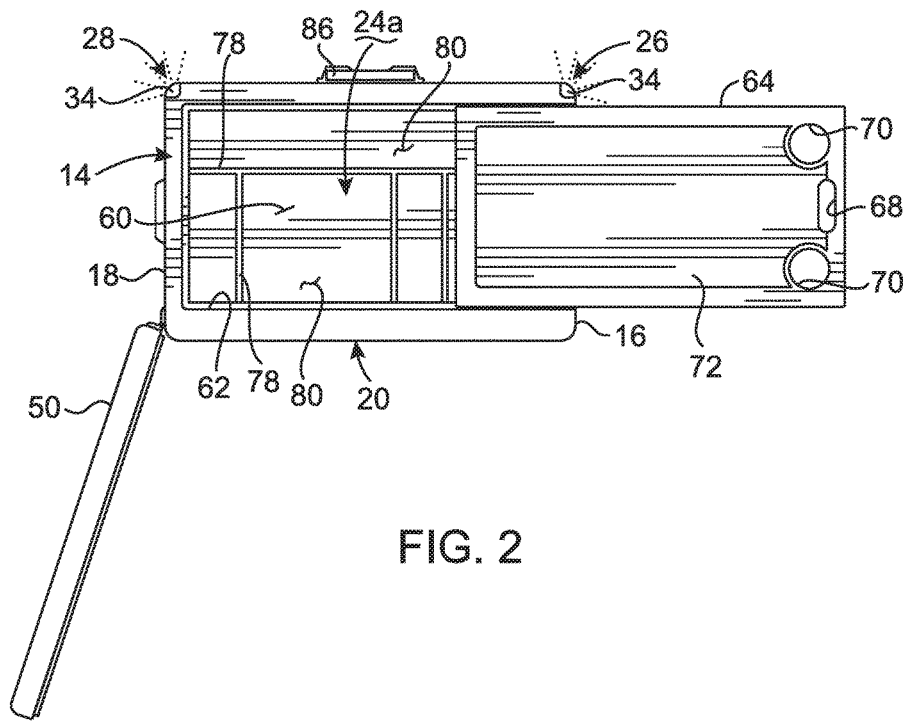
FIG. 2 is a top plan of a cooler according to an embodiment of the present invention.
Figure 7:
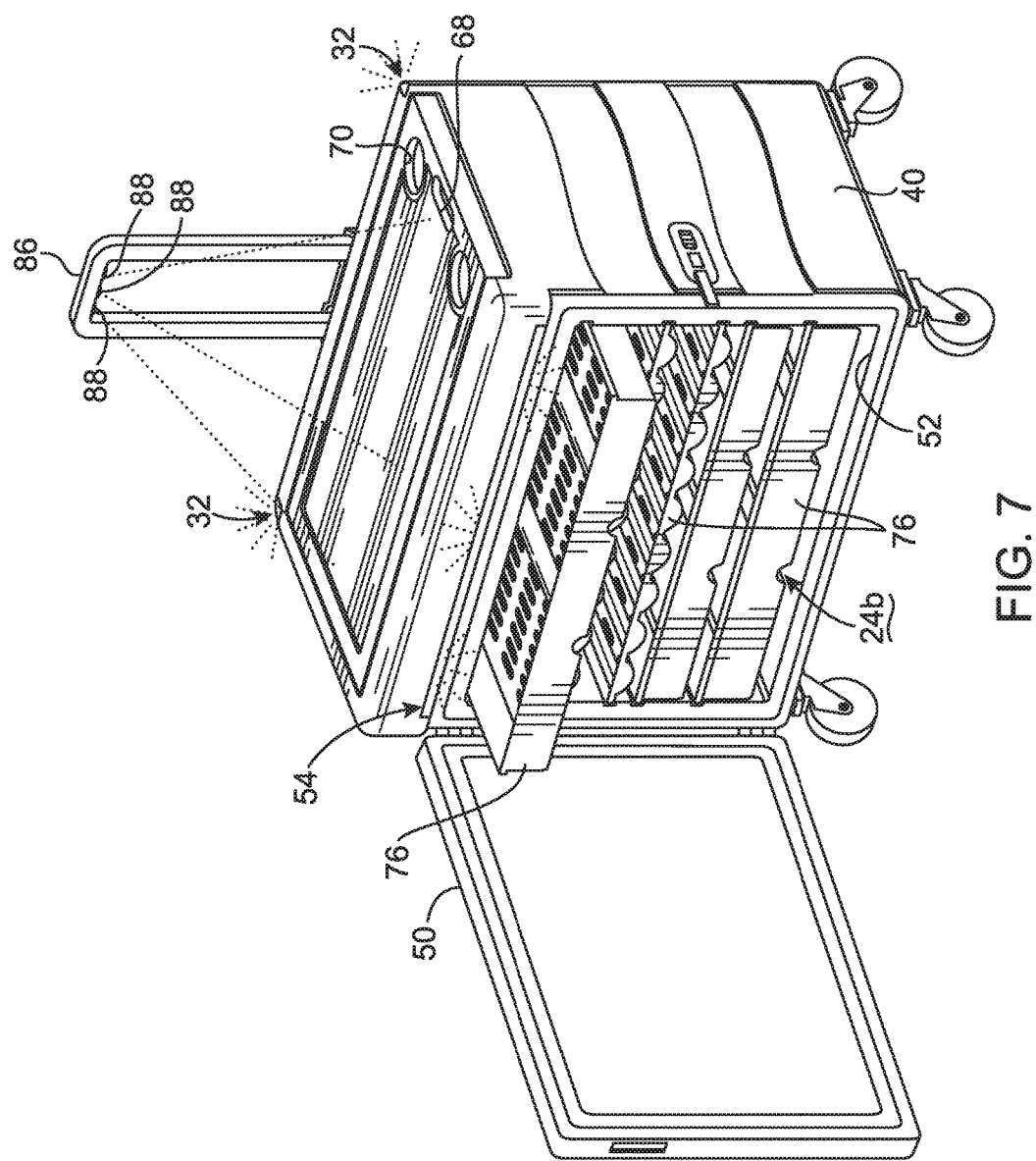
FIG. 7 is a front perspective of a cooler according to an embodiment of the present invention, illustrating a handle having lights to illuminate a top of the cooler.
Figure 8:
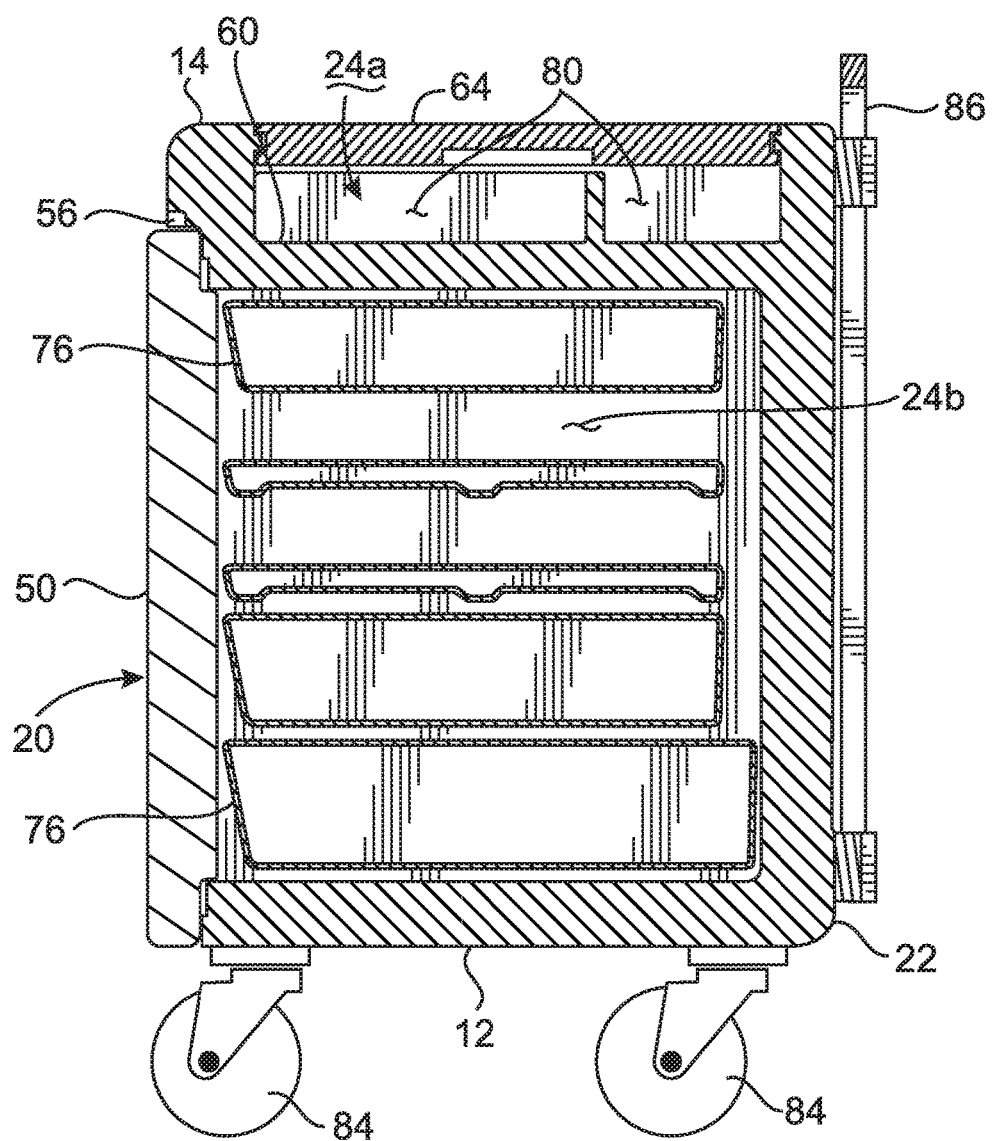
FIG. 8 is a section of a cooler according to an embodiment of the present invention.

Referring to FIGS. 2 and 8, an intermediate surface 60 divides the interior 24 of the cooler into a top portion 24a above the intermediate surface and a bottom portion 24b below the intermediate surface. The front opening 52 provides access to the bottom portion 24b of the interior 24. A top opening 62 provides access to the top portion 24a of the interior 24. In the illustrated embodiment, the front opening 52 is substantially vertical, and the top opening 62 is substantially horizontal. The top 14 of the cooler 10 comprises a door 64 movable between an open position (FIGS. 1-3) and a closed position (FIG. 7) to selectively permit access to the top portion 24a of the interior 24 through the top opening 62. In one embodiment, the door 64 is slidable (e.g., along rails) between the open position and the closed position, although other configurations are within the scope of the present invention.

As illustrated, the cooler 10 may include a support 66 to support door 64 when it is slid horizontally to the open position. The support 66 may be attached to one of the sides of the cooler and pivoted away from the side of the cooler to engage and support the door 64. Alternatively, the support 66 may be attached to the door 64 and pivot away from the door (e.g., by gravity force) to engage the side of the cooler to support the door. Other configurations are within the scope of the present invention, including omitting the support or providing supports of different constructions.

As illustrated, the door 64 may optionally include a handle or grip opening 68 for use in sliding the door between the open and closed positions. In one embodiment, the door 64 may include one or more cup holders 70 for holding beverages. Preferably, the door 64 comprises a food preparation surface 72. For example, the door 64 may include a cutting board, butcher block, or other surface suitable for use in food preparation.

Figure 3:
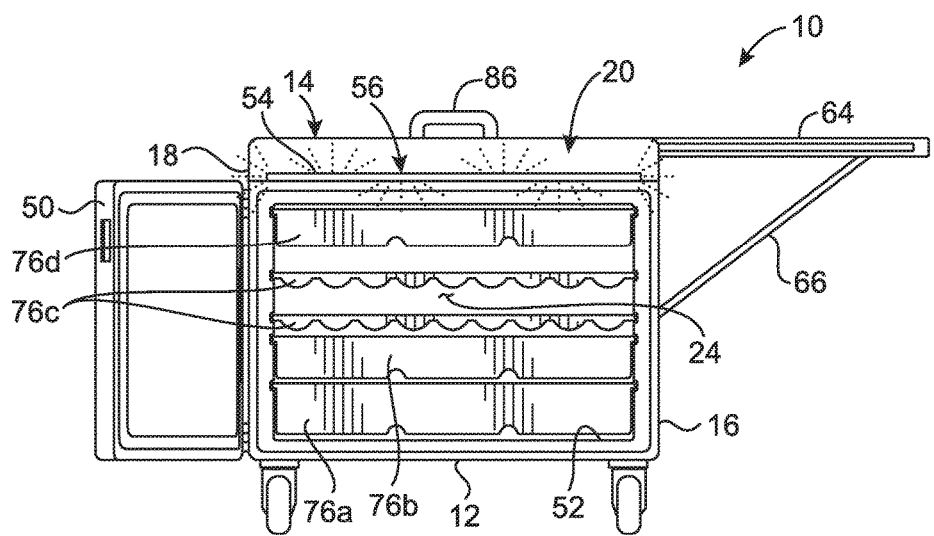
FIG. 3 is a front elevation of a cooler according to an embodiment of the present invention.

Referring to FIGS. 3, 7, and 8, the bottom portion 24b of the interior 24 is insulated to maintain the temperature of items placed in the bottom portion. For example, in one embodiment, the bottom portion 24b of the interior 24 is insulated with pressure injected commercial grade polyurethane. The bottom portion 24b may include at least one drawer 76 slidable between an open position (FIG. 7) and a closed position (FIG. 8). In the illustrated embodiment, multiple drawers 76 are positioned in the bottom portion 24b of the interior 24. Each drawer 76 may be specifically configured and designed to receive one or more specific food items. For example, the cooler 10 may include at least one of: a drawer configured and designed to receive ice for maintaining a cool temperature in the insulated bottom portion 24b of the interior 24 (see, e.g., drawer 76a in FIG. 3); a drawer configured and designed to receive meat (see, e.g., drawer 76b in FIG. 3); a drawer configured and designed to receive drinks, such as bottled or canned beverages (see, e.g., drawers 76c in FIG. 3); and a drawer configured and designed to receive buns and/or condiments (see, e.g., drawer 76d in FIG. 3). As illustrated, the drawers 76 are spaced from each other and from the cooler walls and may further include slots to enhance the circulation of cold air in the bottom portion 24b of the interior 24. It is understood that other drawer configurations are within the scope of the present invention.

Figure 6:
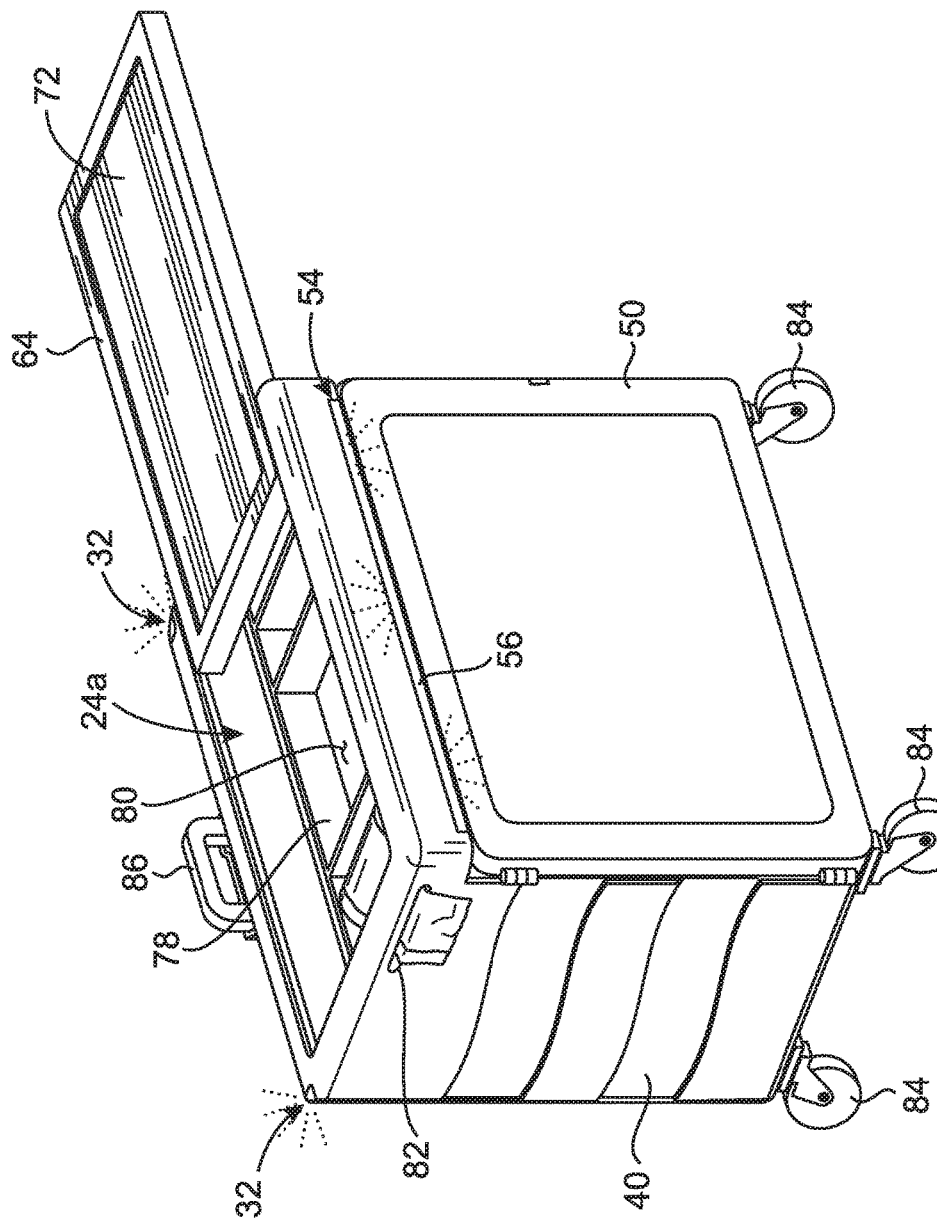
FIG. 6 is a front perspective of a cooler according to an embodiment of the present invention.

Referring to FIG. 6, the top portion 24a of the interior 24 is preferably not insulated. The top portion 24a comprises at least one divider 78 separating the top portion into compartments 80. The compartments 80 are configured to hold at least one of utensils, napkins, and food preparation tools. In one embodiment, one of the compartments 80 is configured to hold a roll (e.g., a roll of trash bags, a roll of paper towels). One of the cooler walls (e.g., the left side 16 or the right side 18) adjacent the roll compartment includes a slot 82 for dispensing individual items from the roll.

As seen in FIGS. 1-8, the cooler 10 includes wheels 84 for use in transporting the cooler. The wheels can be locking wheels (see, e.g., FIG. 1) to permit the cooler to be positioned in one place when in use, without moving. As illustrated, the cooler 10 can include four wheels 84 positioned at the four corners of the bottom 12. Alternatively, the cooler 10 could include two wheels positioned at the back corners of the bottom 12. Other configurations are within the scope of the present invention. Optionally, the cooler can include carrying handles on the sides of the cooler for use in transporting the cooler. The cooler 10 further includes a handle 86 on the back 22 for use in transporting the cooler 10 using the wheels 84. As illustrated, and as known in the art, the handle 86 can be a telescoping handle that can be extended upward for a user to grab while rolling the cooler, and retracted downward for storage when the cooler is not being moved.

Referring now to FIG. 7, the handle 86 includes at least one light 88. In the illustrated embodiment, the handle 86 includes three lights 88. The lights 88 can be positioned on a either a front side or an underside of the handle 86. Each of the lights 88 is directed toward the top 14 of the cooler 10 to illuminate the food preparation surface 72 and/or the top portion 24a of the interior 24. In one embodiment, the lights 88 are positioned on the underside of the handle 86, and are oriented at an angle of approximately 45° to illuminate the food preparation surface 72 and/or the top portion 24a. Optionally, the lights 88 can be directed to illuminate a maximum area of the top 12, such as by directing a left-most light 88 toward a left portion of the top, a middle light 88 toward a middle portion of the top, and a right-most light 88 toward a right portion of the top. In one embodiment, the lights 86 are LED lights that are turned on or off by a switch (e.g., a pressure switch). The handle 86 can be extended to any level between the fully retracted position and the fully extended position, in order to position the lights 88 as desired by the user. In one embodiment, the handle 86 functions as a casing for the lights and for a power source (e.g., battery) for powering the lights. A button or pressure switch on the handle 86 turns the lights 88 on and off. It is understood that the lights 88 can have a different configuration within the scope of the present invention, and that the cooler need not include the lights 88 on the handle 86 within the scope of the present invention.

The cooler 10 can be customized according to a user's desires. For example, the textured surface(s) 40 of the cooler 10 can include a school, business, or team name, logo, or mascot for illumination by the lights 32. The hollow casing(s) 34, 56 can be a colored plastic, if desired. The lights 32, 54, 88 can be LED lights capable of changing colors. Optionally, some or all of the lights can be set to flashing, strobe, constant, or other setting upon selection of the user. Optionally, some or all of the lights can be dimmable. In one embodiment, some or all of the lights are controlled by remote. A user can turn the lights on and off using a remote, and can choose the color of the lights and the light setting and/or intensity (if applicable; e.g., flashing, constant, dimming level) using the remote. For example, the textured side can include a team logo, and the user can choose to illuminate the cooler with lights the same colors as the team logo. The cooler 10 includes an insulated bottom portion 24b for maintaining food and drinks at a cool temperature, a top portion 24a for holding food and food-related items that do not need to be maintained at a cool temperature, and a food preparation surface 72. Thus, the cooler 10 is a customizable and transportable cooler that includes food, beverage, utensil, and accessory storage for use at, for example, a barbeque or a tailgate.

It will be understood that various features of the aspects of the cooler described herein may be used in combination with, or instead of, particular features of another aspect. Having provided the disclosure in detail, it will be apparent that modifications and variations are possible without departing the scope of the disclosure defined in the appended claims. Furthermore, it should be appreciated that all examples in the present disclosure are provided as non-limiting examples.

What is claimed is:

1. A cooler comprising:
   a bottom;
   a top opposite the bottom;
   a left side extending between a left edge of the bottom and a left edge of the top;
   a right side opposite the left side and extending between a right edge of the bottom and a right edge of the top;
   a front extending between a front edge of the bottom and a front edge of the top;
   a back opposite the front and extending between a back edge of the bottom and a back edge of the top, the bottom, top, left side, right side, front, and back defining an interior of the cooler;
   a generally hollow casing extending along a junction between the left side and the back from the top of the cooler to the bottom of the cooler; and
   a plurality of lights extending along the junction between the left side and the back, the plurality of lights being contained in the generally hollow casing at spaced locations along a length of the generally hollow casing.

2. A cooler as recited in claim 1, wherein the generally hollow casing comprises a first section extending along the length of the generally hollow casing and having a first material finish and a second section extending along the length of the generally hollow casing and having a second material finish different from the first material finish.

3. A cooler as recited in claim 2, wherein a portion of the plurality of lights extending along the first section are positioned and configured to direct light away from the junction between the left side and the back of the cooler.

4. A cooler as recited in claim 2, wherein a portion of the plurality of lights extending along the second section are positioned and configured to direct light along the left side of the cooler.

5. A cooler as recited in claim 2, wherein the plurality of lights includes a first portion extending along the length of the generally hollow casing and configured to direct light through the first section of the generally hollow casing and a second portion extending along the length of the generally hollow casing and configured to direct light through the second section of the generally hollow casing.

6. A cooler as recited in claim 4, wherein the left side of the cooler comprises a textured surface such that the lights directed along the left side of the cooler illuminate the textured surface of the cooler.

7. A cooler as recited in claim 6, wherein the textured surface is at least one of waved, etched, and notched.

8. A cooler as recited in claim 6, wherein the textured surface comprises a plastic 3D printed surface.

9. A cooler as recited in claim 1, wherein the front of the cooler comprises a front door movable between an open position and a closed position to selectively permit access to the interior of the cooler through a front opening, and further comprising a plurality of lights extending along a top edge of the front opening to illuminate at least one of the front opening and the interior of the cooler.

10. A cooler as recited in claim 1, further comprising an intermediate surface positioned between the bottom and the top of the cooler and dividing the interior of the cooler into a bottom portion below the intermediate surface and a top portion above the intermediate surface.

11. A cooler as recited in claim 10, wherein the bottom portion of the interior is insulated to maintain the temperature of items placed in the bottom portion of the interior.

12. A cooler as recited in claim 10, wherein the top portion of the interior is not insulated.

13. A cooler as recited in claim 10, wherein the top portion of the interior is accessible through a top opening, the top of the cooler comprising a top door movable between an open position in which the top opening is exposed to permit access to the top portion of the interior through the top opening and a closed position in which the top door closes the top opening such that the top portion of the interior is enclosed between the intermediate surface and the top of the cooler.

14. A cooler as recited in claim 10, wherein the bottom portion of the interior is accessible through a front opening, the front of the cooler including a front door movable between an open position in which the front opening is exposed to permit access to the bottom portion of the interior through the front opening and a closed position in which the front door closes the front opening such that the bottom portion of the interior is not accessible.

15. A cooler as recited in claim 14, wherein the bottom portion of the interior includes at least one drawer slidable between an open position in which the drawer extends outside the front opening of the cooler for loading or unloading and a closed position in which the drawer is positioned in the bottom portion of the interior for storage.

16. A cooler as recited in claim 10, wherein the top portion of the interior comprises at least one divider separating the top portion into compartments configured to hold at least one of utensils, napkins, and food preparation tools.

17. A cooler as recited in claim 10, wherein the top portion of the interior is configured to receive a roll of trash bags, and at least one of the left and right sides comprises a slot for dispensing the roll of trash bags from the top portion.

18. A cooler as recited in claim 1, further comprising a handle for use in transporting the cooler, the handle including at least one light directed at the top of the cooler.

19. A cooler as recited in claim 1, wherein the top of the cooler is configured for use as a food preparation surface.

20. A cooler comprising:
   a bottom;
   a top opposite the bottom, the top comprising a food preparation surface;
   a left side extending between a left edge of the bottom and a left edge of the top, the left side of the cooler comprising a textured surface;

a right side opposite the left side and extending between a right edge of the bottom and a right edge of the top, the right side of the cooler comprising a textured surface;

a front extending between a front edge of the bottom and a front edge of the top;

a back opposite the front and extending between a back edge of the bottom and a back edge of the top, the bottom, top, left side, right side, front, and back defining an interior of the cooler;

an intermediate surface positioned between the bottom and the top of the cooler and dividing the interior of the cooler into a bottom portion below the intermediate surface and a top portion above the intermediate surface, the bottom portion of the interior being accessible through a front opening and the top portion being accessible through a top opening;

a first hollow casing extending along a junction between the left side and the back of the cooler, the first hollow casing containing a plurality of lights including a first portion configured to direct light outward away from the junction between the left side and the back of the cooler and a second portion configured to direct light along the left side of the cooler;

a second hollow casing extending along a junction between the right side and the back of the cooler, the second hollow casing containing a plurality of lights including a first portion configured to direct light outward away from the junction between the right side and the back of the cooler and a second portion configured to direct light along the right side of the cooler; and a third hollow casing extending along the front of the cooler, the third hollow casing containing a plurality of lights configured illuminate at least one of the front opening and the bottom portion of the interior of the cooler.

* * * * *